United States Patent [19]
Dibner et al.

[11] Patent Number: 5,544,241
[45] Date of Patent: Aug. 6, 1996

[54] TELEPHONE RING DETECTOR

[75] Inventors: Andrew S. Dibner, 7 Norman Rd., Newton, Mass. 02161; William Wang, Lexington, Mass.

[73] Assignee: Andrew S. Dibner, Newton, Mass.

[21] Appl. No.: 495,813

[22] Filed: Jun. 27, 1995

[51] Int. Cl.⁶ .............................. H04M 1/00; H04M 3/00
[52] U.S. Cl. ............................. 379/373; 379/375; 379/82
[58] Field of Search .................................... 379/373, 375, 379/82, 374, 386, 199

[56] References Cited

U.S. PATENT DOCUMENTS

| | | | |
|---|---|---|---|
| 3,777,067 | 12/1973 | Kilby | 379/442 |
| 3,899,644 | 8/1975 | Hunt | 379/373 |
| 4,049,916 | 9/1977 | Danner | 379/76 |
| 4,349,703 | 9/1982 | Chea, Jr. | 379/382 |
| 4,390,843 | 6/1983 | Betts et al. | 379/373 X |
| 4,444,999 | 4/1984 | Sparrevohn | 379/195 |
| 4,451,707 | 5/1984 | Hanscom | 379/373 |
| 4,467,144 | 8/1984 | Wilkerson et al. | 379/373 X |
| 4,491,691 | 1/1985 | Embree et al. | 379/375 |
| 4,536,618 | 8/1985 | Serrano | 379/372 |
| 4,570,034 | 2/1986 | Serrano | 379/373 X |
| 4,620,063 | 10/1986 | Todd | 379/382 |
| 4,674,113 | 6/1987 | Brennan, Jr. et al. | 379/107 |
| 4,677,664 | 6/1987 | Siligoni et al. | 379/382 |
| 4,679,229 | 7/1987 | Yamaguchi | 379/373 |
| 4,689,816 | 8/1987 | Wood | 379/382 |
| 4,731,828 | 3/1988 | Basehore | 379/382 |
| 4,731,829 | 3/1988 | Bonnet et al. | 379/382 |
| 4,813,070 | 3/1989 | Humphreys et al. | 379/213 |
| 4,831,646 | 5/1989 | Hashimoto | 379/82 |
| 4,856,055 | 8/1989 | Schwartz | 379/374 |
| 4,893,329 | 1/1990 | O'Brien | 379/88 |
| 4,935,959 | 6/1990 | Markovic et al. | 379/377 |
| 4,939,775 | 7/1990 | Houck et al. | 379/373 |
| 4,974,253 | 11/1990 | Hashimoto | 379/100 |
| 4,975,940 | 12/1990 | Hashimoto | 379/67 |
| 4,995,111 | 2/1991 | Tojo et al. | 379/382 |
| 5,005,199 | 4/1991 | Dupillier | 379/375 |
| 5,027,391 | 6/1991 | O'Neill et al. | 379/373 |
| 5,036,534 | 7/1991 | Gural | 379/67 |
| 5,040,209 | 8/1991 | Greenberg et al. | 379/373 |
| 5,062,133 | 10/1991 | Melrose | 379/94 |
| 5,063,589 | 11/1991 | Tsushima | 379/82 |
| 5,151,972 | 9/1992 | Lorenz et al. | 379/100 X |
| 5,159,627 | 10/1992 | Hama | 379/374 |
| 5,163,079 | 10/1992 | Crowdis | 379/27 |
| 5,168,517 | 12/1992 | Waldman | 379/67 |
| 5,200,992 | 4/1993 | Yoshino | 379/93 |
| 5,218,635 | 6/1993 | Bonvallet et al. | 379/386 |
| 5,224,155 | 6/1993 | Satomi et al. | 379/100 |
| 5,228,081 | 7/1993 | Warner et al. | 379/399 |
| 5,233,649 | 8/1993 | Guerra, Jr. | 379/373 X |
| 5,287,404 | 2/1994 | Pepper et al. | 379/377 |

(List continued on next page.)

OTHER PUBLICATIONS

Brochure of Hello Direct containing pp. 40–42, "3 Pages of PCTI Products" No Date.
Brochure of Hello Direct containing pp. 37–39, "Why waste money on separate phone, fax and modem lines"? No Date.

*Primary Examiner*—Jeffery Hofsass
*Assistant Examiner*—Devendra Kumar
*Attorney, Agent, or Firm*—Weingarten, Schurgin, Gagnebin & Hayes

[57] ABSTRACT

A telephone ring detector detects a ring signal voltage from a diverse set of signals transmitted on a telephone line before a complete alternating current ring signal cycle is received. In an exemplary embodiment, the ring detector includes a voltage threshold setting device for establishing a voltage threshold and comparing the ring signal voltage to the voltage threshold to provide an output signal when the ring signal voltage is above the voltage threshold. A pair of zener diodes having a selected voltage value can provide the threshold setting and comparison functions. A microprocessor, including a timer for measuring a time duration of the output signal, outputs a ring detection signal when the time duration exceeds a predetermined time interval value, which is substantially less than a full ring cycle. A line switch responsive to the ring detector is provided to direct communication signals to a telecommunications device.

24 Claims, 9 Drawing Sheets

U.S. PATENT DOCUMENTS

| | | | |
|---|---|---|---|
| 5,293,420 | 3/1994 | Nagato | 379/382 |
| 5,311,575 | 5/1994 | Oh | 379/88 |
| 5,325,427 | 6/1994 | Dighe | 379/386 |
| 5,329,584 | 7/1994 | Nagato | 379/382 |
| 5,335,271 | 8/1994 | Takato et al. | 379/382 |
| 5,339,354 | 8/1994 | Becker et al. | 379/67 |
| 5,355,407 | 10/1994 | Lazik | 379/381 |
| 5,363,438 | 11/1994 | Tanaka | 379/375 |
| 5,388,150 | 2/1995 | Schneyer et al. | 379/67 |
| 5,392,334 | 2/1995 | O'Mahony | 379/67 |
| 5,392,347 | 2/1995 | Ito et al. | 379/372 |
| 5,425,089 | 6/1995 | Chan et al. | 379/183 |

TELEPHONE RING DETECTOR

FIELD OF INVENTION

The present invention relates to telecommunications, and more particularly to a ring signal detector.

BACKGROUND OF INVENTION

An ever increasing number of devices, such as the computer modem, the answering machine, and the facsimile machine, are linked to a network which was conceived and configured to accommodate a single type of device having a single use, namely, the voice telephone. Thus, the "telephone network" has evolved into a "telecommunications network."

The telecommunications network permits transmission of a diverse set of signals capable of supporting the various requirements of telecommunications devices. Exemplary signals include: a direct current voltage; an alternating current ring signal voltage; a dial tone signal; and communication signals having device identification tones. Of course, the signals can also include line noise, spikes, and other transient signals which can interfere with communication.

In certain situations, it can be desirable to have separate links to the network (phone lines) for each telecommunication device. However, due to cost and other considerations, more than one device commonly shares a line with another device, wherein each device is at a different location or extension. Therefore, when a ring signal, nominally a 20 Hz, 90 Vrms AC signal having a ring cycle of approximately 50 milliseconds, is received from the network, all extensions ring. If, for example, a telephone and a facsimile machine share a line and a ring signal is received, the telephone rings and is answered to determine the nature of the incoming call. If the distinctive facsimile identification tone is heard, the person answering the telephone activates the facsimile machine and hangs up the telephone.

Line switching devices exist to direct incoming communication signals to a telecommunications device sharing a line with a telephone so that a person does not need to answer the telephone and manually select another device. A typical line switching device operates by detecting a ring signal, identifying a distinctive identification tone, and activating an appropriate device. When a line switching device is in series with a telephone, the switching device can detect a ring signal before the telephone does. However, this approach is not practical when there are multiple extension telephones as a switching device must be associated with each telephone or be installed at the telephone line entry to the building.

Instead of being wired in series, telephone extensions sharing a single line are generally connected in parallel so that incoming signals are provided to each of the extensions at substantially the same time. However, known line switching devices operate so slowly that when a telephone shares a line with a telephone answering device (TAD) or a facsimile machine (FAX) (each at a different extension), the telephone rings, even though the TAD or the FAX is eventually activated. This can be particularly annoying if the TAD or FAX receives calls frequently or if calls are received late at night in the home.

An example of the type of line switching device that can be used in a shared line situation, but which still allows ringing at all extensions, is disclosed in U.S. Pat. No. 4,939,775 to Houck et al. In order to identify a distinctive ring signal, the Houck device must monitor an incoming ring signal for at least one complete ring cycle. However, the completion of a ring cycle will cause a telephone on an extension to ring.

SUMMARY OF THE INVENTION

The present invention overcomes the above disadvantages by providing a ring detector capable of detecting a ring signal significantly faster than the time duration of a typical alternating current ring signal cycle. The rapid ring detection allows communication signals to be routed or switched to a telecommunications device in accordance with the identification tone without causing audible ringing of a telephone that shares a line in parallel with the device receiving the call.

In an exemplary embodiment, a ring detector includes a voltage threshold setting device for establishing a voltage threshold and for comparing the ring signal voltage to the voltage threshold to provide an output signal when the ring signal voltage is above the voltage threshold. A pair of zener diodes having a selected voltage value can provide the threshold setting and comparison functions. A device, such as a microprocessor, or hardware that can perform a timing function measures a time duration of the output signal and outputs a ring detection signal when the time duration exceeds a predetermined time interval value.

Additional features of the invention include: a ring signal generator for creating a ring signal for downline equipment upon receipt of a ring detection signal from the microprocessor; a holding circuit to maintain an "off-hook" condition; and a ring signal coupler to protect against inadvertent triggering of the ring detector. Signal conditioning can also be provided by a dial tone detector and a direct current voltage detector.

BRIEF DESCRIPTION OF THE DRAWINGS

The invention will be more fully understood by reference to the following detailed description when considered in conjunction with the accompanying drawings, in which.

DETAILED DESCRIPTION OF THE INVENTION

Figure 1:
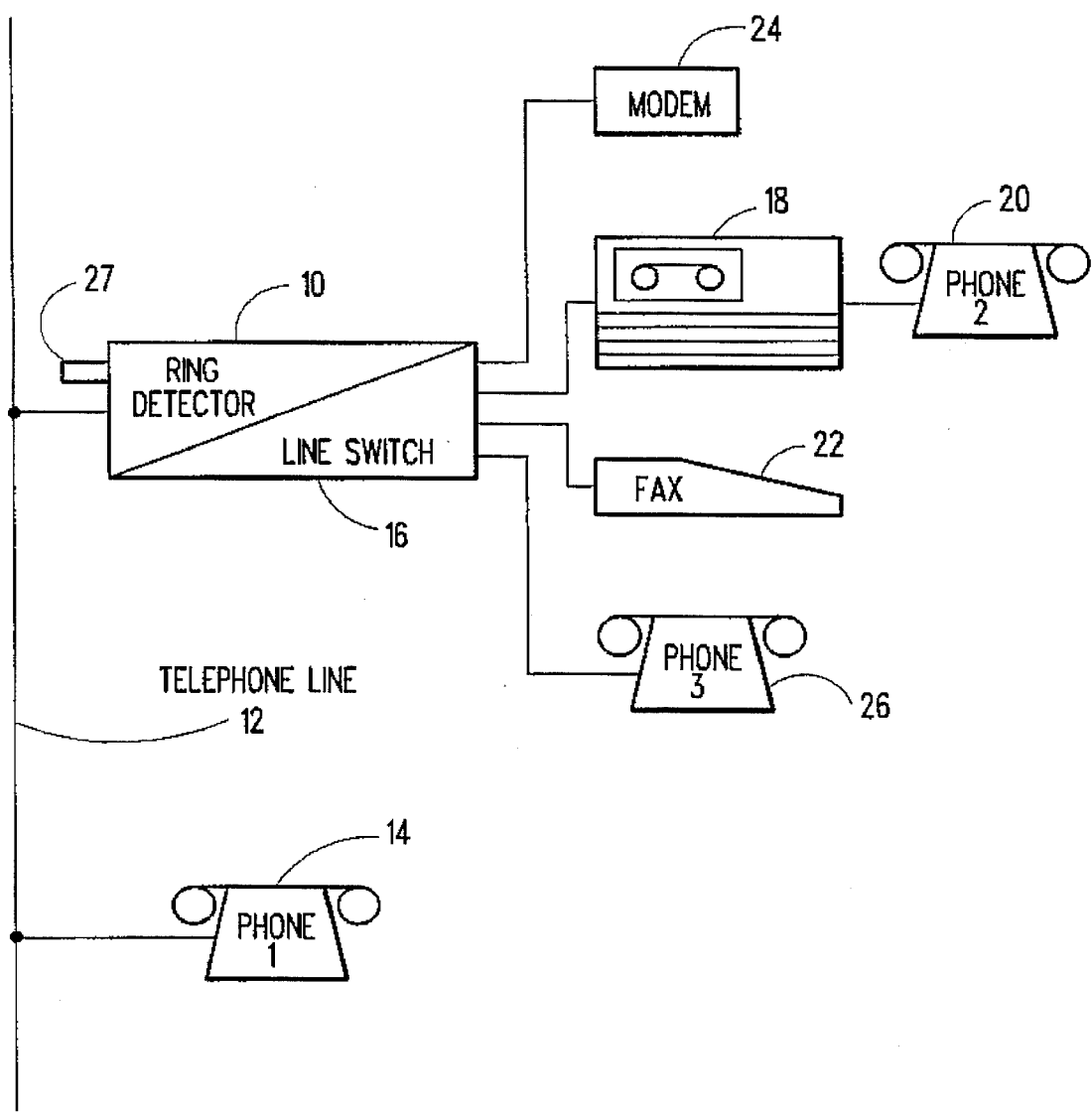
FIG. 1 is a block diagram illustrating a ring detector in association with telecommunications equipment.

FIG. 1 is an illustration of a ring detector 10 in accordance with the invention that is connected to a telephone line 12 in parallel with a first telephone 14. The ring detector is in communication with a line switch 16 that is connected to one or more telecommunication devices such as a telephone answering machine 18 connected to a second telephone 20, a facsimile machine 22, a modem 24, and/or a third telephone 26.

The ring detector 10 detects a ring signal from the diverse set of signals associated with an incoming call and processes the ring signal. A line switch 16, responsive to the ring detector, directs incoming communication signals to the telecommunication device to which the incoming call was directed. Significantly, the ring detector 10 processes the ring signal rapidly enough to create an "off-hook" condition and allows the line switch 16 to direct the incoming call appropriately, so that other telecommunications devices installed in parallel with the ring detector 10, such as the first telephone 14 do not receive enough of the ring signal to trigger production of an audible signal.

The ring detector can further include a manual on/off switch and a timer 27 which can be set by a user to activate and deactivate the ring detector at predetermined times.

Figure 2:
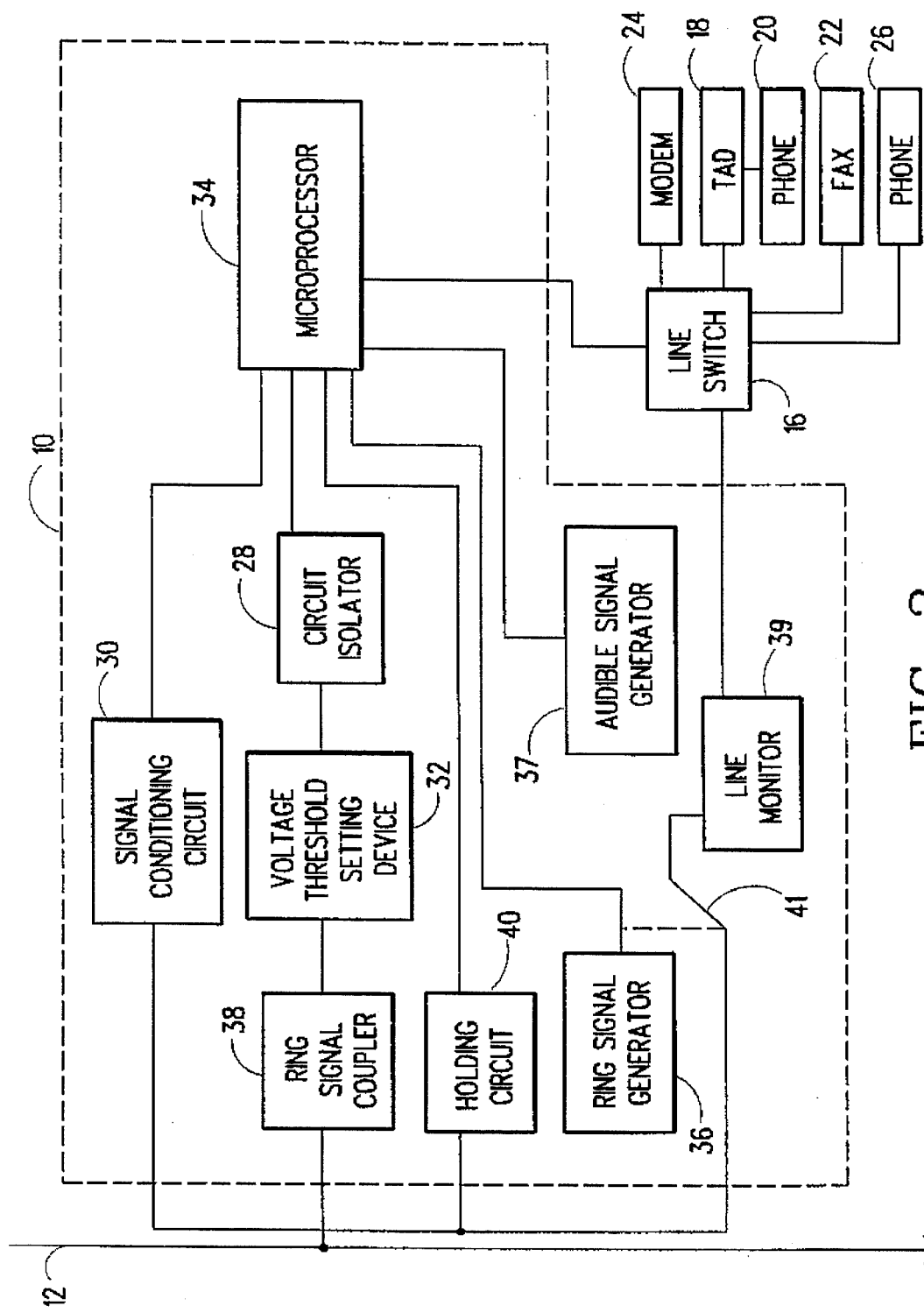
FIG. 2 is a detailed block diagram of the ring detector of FIG. 1.

Referring now to FIG. 2, a block diagram of the ring detector 10 is shown. In the illustrated embodiment, the ring detector 10 includes a circuit isolator 28, a signal conditioning circuit 30, a voltage threshold setting device 32, a microprocessor 34, a ring signal generator 36, an audible signal generator 37, a ring signal coupler 38, a line monitor 39, and a holding circuit 40.

The ring signal coupler 38 outputs the ring signal to the voltage threshold setting device 32. An optional circuit isolator 28 is interposed between the voltage threshold setting device 32 and the microprocessor 34. When the ring signal voltage exceeds the predetermined voltage threshold value established by the voltage threshold setting device 32, the circuit isolator 28 provides an output, such as by switching to an "on" state, that is sampled by the microprocessor 34.

The microprocessor 34, typically a PIC16C54 microchip, which receives and samples the output of the circuit isolator 28, is capable of measuring the time duration of the output or the "on" state. In alternative embodiments of the ring detector, a hard-wired timer or software can be used to provide the time measurement functions.

After the circuit isolator has provided an output for the predetermined time interval, the microprocessor 34 outputs a signal to a ring signal generator 36 that provides the line switch 16 with a ring signal. The microprocessor 34 can also provide a signal to an audible signal generator 37 for creation of an audible signal, if desired.

In an alternative embodiment of the ring detector, a line monitor 39 is interposed between the ring signal generator 36 and the line switch 16. Concurrent with generation of the ring signal, the microprocessor can cause a switching device 41, such as a relay, to enable passage of communication signals from the telephone line 12 to the line switch 16. The line switch "hand-shakes" with the incoming call and directs the call to the intended telecommunications device. Thus, even if other telecommunications devices are connected in parallel to the line switch/ring detector, only the intended device will be activated. The line monitor 39 connects the telephonic devices to the telephone line 12 only if any one of the devices is in the "off-hook" condition.

The signal conditioning circuit 30 is connected to the telephone line 12 and the microprocessor 34. The signal conditioning circuit 30 which can include a DC voltage detector and/or a dial tone detector is an optional feature of the ring detector 10. Additional details of the signal conditioning circuit are discussed with respect to FIGS. 7–9.

The holding circuit 40 maintains an "off-hook" condition by drawing current from the phone line 12. Telecommunications devices such as a telephone answering machine include a holding circuit to prevent an incoming call from being dropped when an "off-hook" condition or state is established (i.e., when a call is being received or placed). Therefore, a separate holding circuit need not be included in a ring detector 10 that is incorporated into such a device. However, when the ring detector 10 is configured as a stand-alone apparatus, the ring detector 10 can include a holding circuit 40.

Figure 3:
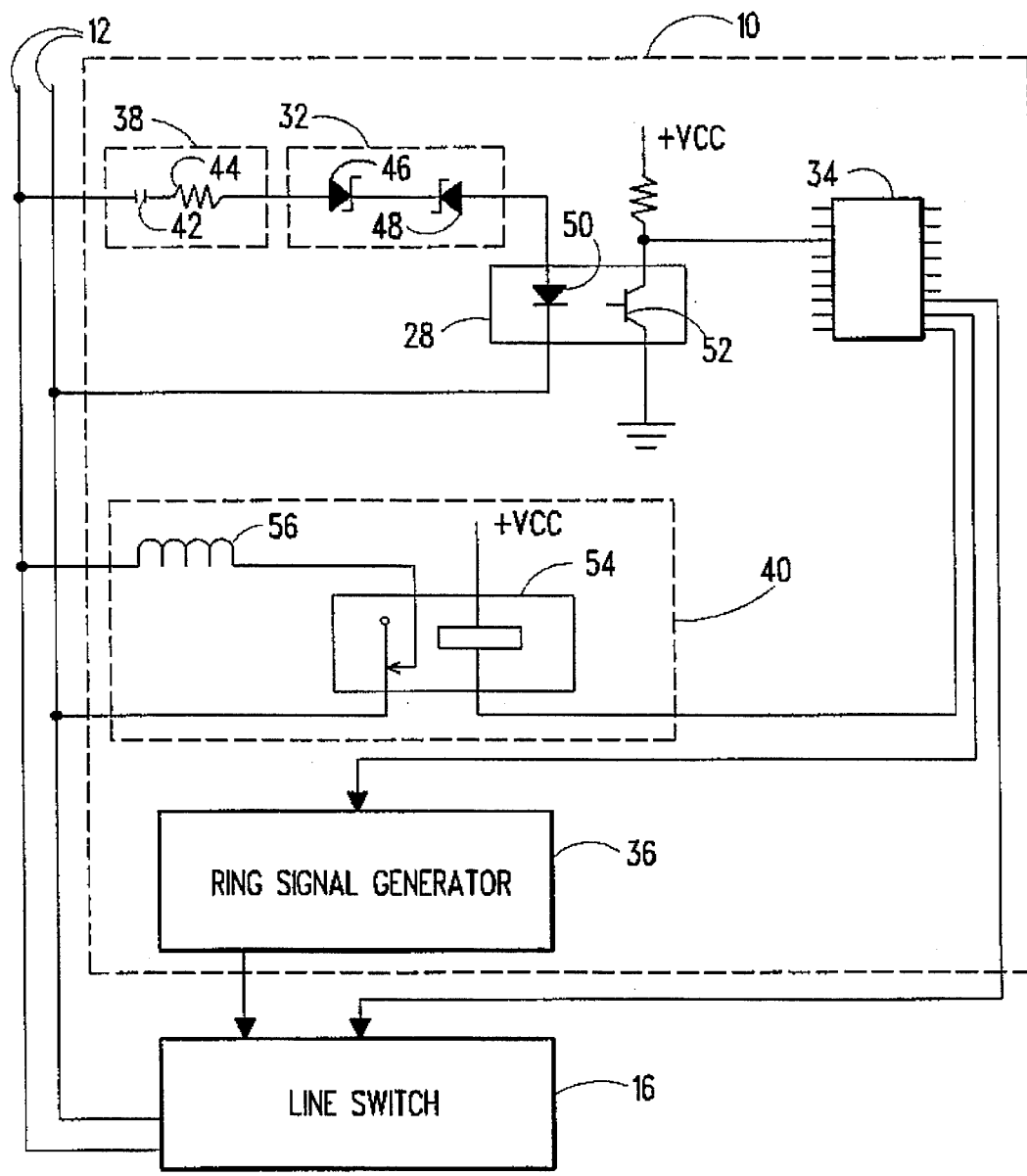
FIG. 3 is a schematic diagram of the ring detector of FIG. 2.

FIG. 3 schematically illustrates additional details of an exemplary ring detector 10 with respect to a ring signal coupler 38, the voltage threshold setting device 32, the circuit isolator 28, and a holding circuit 40.

A ring signal coupler 38 includes a blocking capacitor 42 in series with a current limiting resistor 44. The blocking capacitor 42 AC couples and outputs the ring signal voltage from the phone line 12 (depicted as a two wire phone line) to the current limiting resistor 44.

The voltage threshold setting device 32 is connected in series with the ring signal coupler 38 and includes an anode of a first zener diode 46 connected in series with a cathode of a second zener diode 48. The voltage value of the zener diodes 46 and 48 determines the value of the voltage threshold. For example, zener diodes 44 and 46 having a voltage value of 39 volts establish a voltage threshold of approximately 45 volts. The voltage threshold, however, can be set as required to prevent a false ring signal from being triggered by rotary dialing equipment, for example. Thus, the setting of the zener diodes provides a comparator function for comparing the preselected voltage threshold to the voltage value of an AC ring signal. However, other devices capable of comparing a preselected voltage threshold to the voltage value of an AC ring signal and providing an output are compatible with the ring detector.

The circuit isolator 28, connected in series with the voltage threshold setting device 32, can include an optoisolator having a light-emitting-diode 50 and an optoelectronic-transistor 52. When a ring signal voltage exceeds the voltage threshold established by the zener diodes 44 and 46, the light-emitting-diode 50 activates the optoelectronic-transistor 52 which outputs an "on" signal to the microprocessor 34 for the time duration that the ring signal voltage is above the voltage threshold.

FIG. 3 also illustrates an exemplary holding circuit 40, responsive to the microprocessor 34 of the ring detector 10, wherein the holding circuit includes a relay 54 connected in series with a holding coil 56 that is coupled to the phone line 12.

Figure 4:
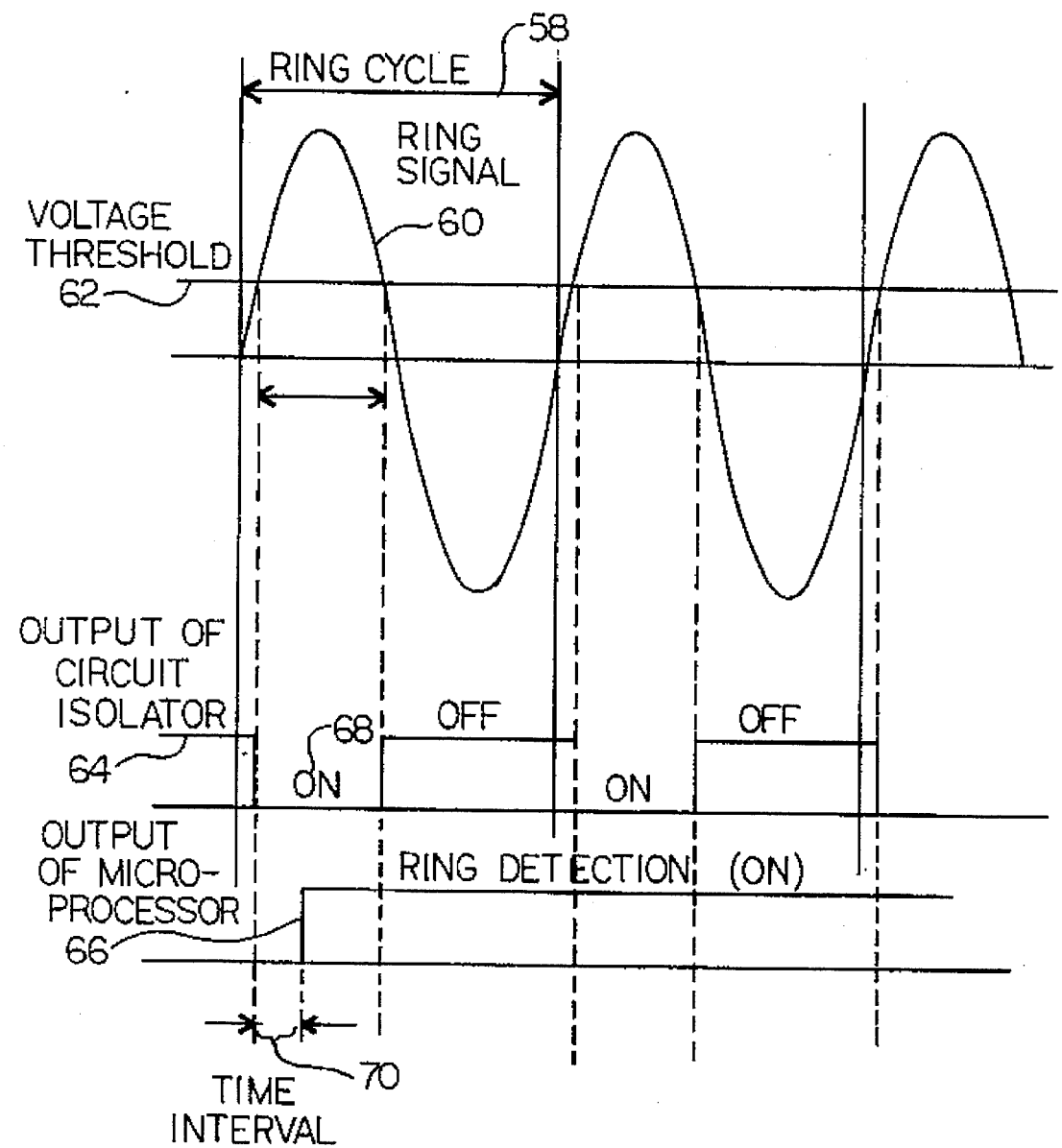
FIG. 4 is a timing diagram of input and output signals for the ring detector shown in FIG. 3.

FIG. 4 is a timing diagram of exemplary signal activity that is useful in explaining the operation of the ring detector 10. A ring cycle 58 corresponds to a complete cycle of an alternating current ring signal 60. A voltage threshold, established by the voltage threshold setting device 32, is represented by a line 62. The output from the circuit isolator 28 is represented by a wave form 64. The ring detection signal output of the microprocessor 34 is indicated by a line 66.

Upon examination of the graph of FIG. 4, it will be noted that the circuit isolator 28 switches to an "on" state 68 when the ring signal 60 is above the voltage threshold. The microprocessor 34, receiving the output of the circuit isolator 28, outputs a ring detection signal 66 after the predetermined time interval 70 has elapsed. A time interval 70 of five milliseconds is typical and demonstrates how quickly the ring detector 10 is able to respond, thereby precluding ringing of other telecommunications devices wired in parallel to the ring detector. The predetermined time interval 70 is less than a ring cycle of the ring signal 60, as shown in FIG. 4, and is typically less than ¼ of a ring cycle. The time interval 70, however, can be adjusted as desired. For example, if a time interval of five milliseconds causes false detection of a ring signal due to transient line noise, the time interval can be increased.

Figure 5:
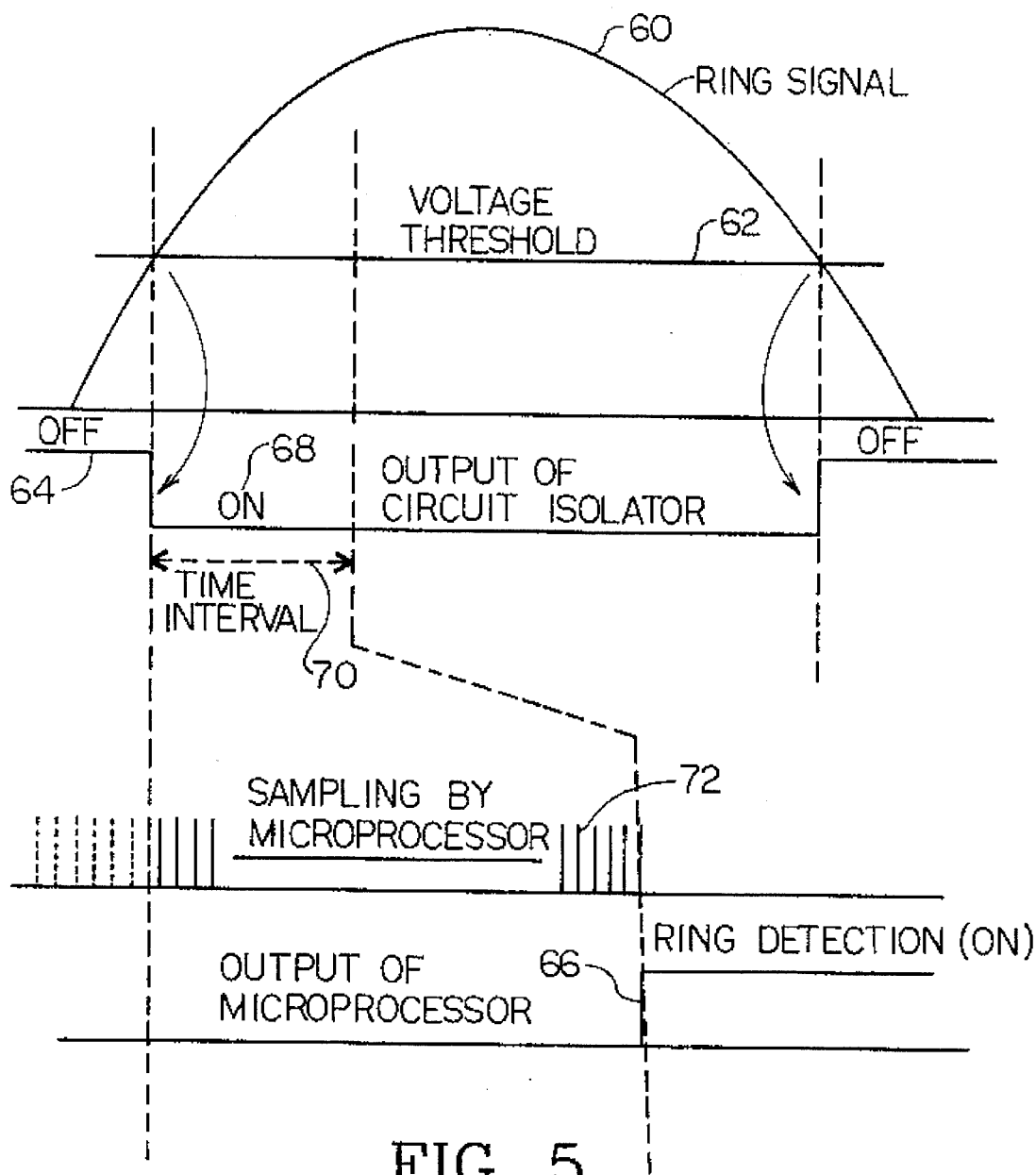
FIG. 5 is a detailed timing diagram of the microprocessor sampling period shown in FIG. 4.

FIG. 5 is a more detailed timing diagram of signal activity illustrated in FIG. 4, with particular emphasis on signal sampling by the microprocessor 34, wherein the microprocessor samples the output 64 of the circuit isolator 28 at a frequency of about five micro-second increments. One thousand samples 72 of an "on" state output 68 are required to exceed a time interval setting of five milliseconds.

Figure 6:
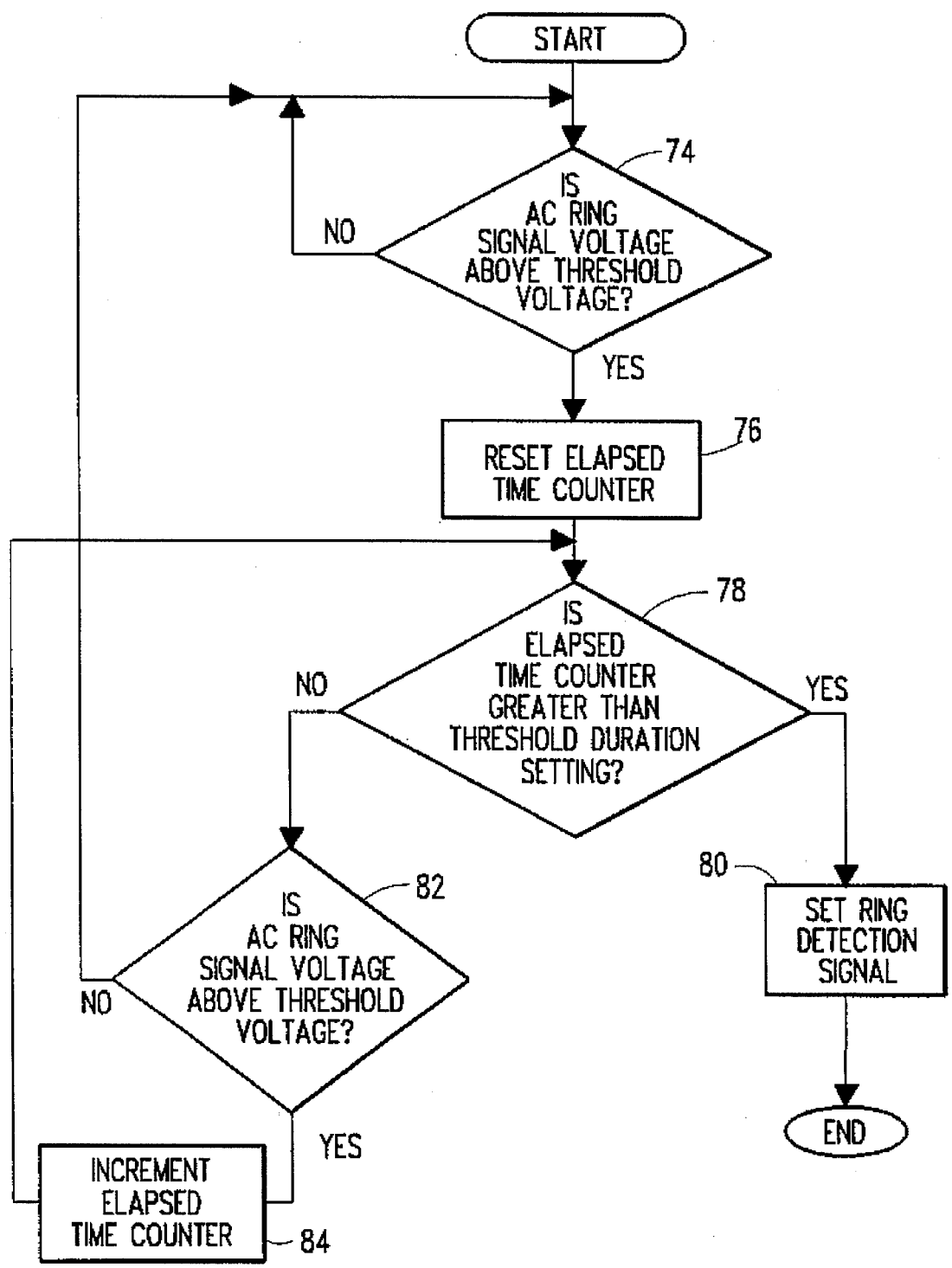
FIG. 6 is a flow diagram for ring detection.

FIG. 6 is a flow diagram of the operation of the ring detector 10. In a step 74, the ring detector 10 loops while awaiting a ring signal 60 having a voltage above the voltage threshold 62. When the ring signal voltage exceeds the voltage threshold 62, an elapsed time counter in the microprocessor 34 is reset in a step 76 and the duration of the ring signal is timed. In a step 78, the duration of the ring signal is compared to the interval setting 70. If the duration of the ring signal is greater than the interval setting 70, the microprocessor 34 outputs a ring detection signal 66 in a step 80.

If the duration of the ring signal is less than the interval setting 70, the ring signal voltage is compared to the voltage threshold 62 in a step 82. If the ring signal voltage is above the voltage threshold 62, the elapsed time counter is incremented in a step 84 and the elapsed time is compared again to the interval setting 70 at step 78. If, in step 82, the ring signal voltage is not above the voltage threshold 62, the ring detector returns to step 74.

Figure 7:
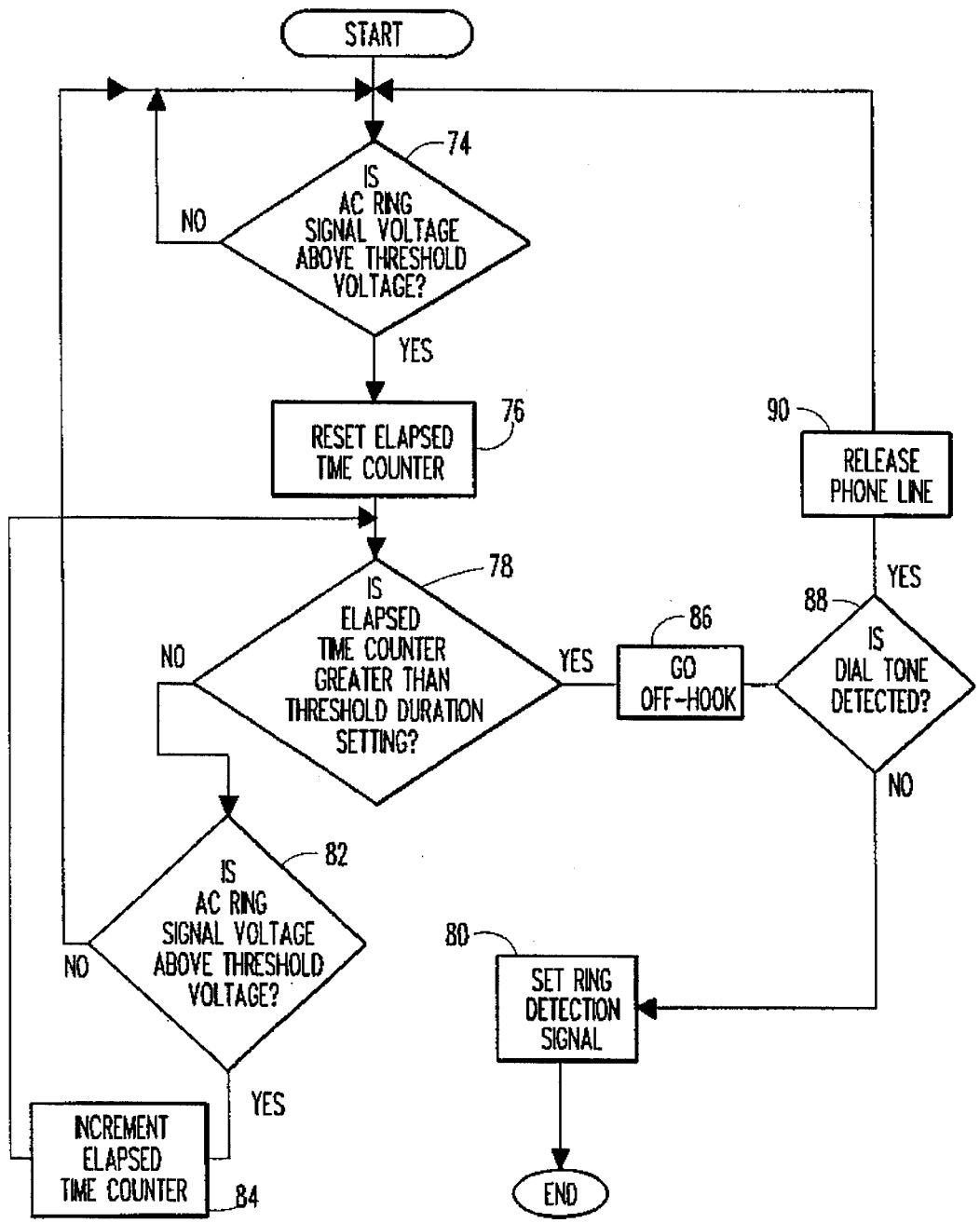
FIG. 7 is a flow diagram for ring detection in an embodiment of the ring detector having a signal conditioning circuit.

FIG. 7 is a flow diagram for an embodiment of the ring detector 10 that includes a signal conditioning circuit 30, in this example a dial tone detector, as described generally with respect to FIG. 2. The dial tone detector helps to ensure that a true call is being processed (communication signals are on the line). For example, an intermittent or false ring signal can be detected which is caused by excessive line transient noise.

The flow diagram of FIG. 7 is similar to the flow diagram of FIG. 6. Therefore, the description of common steps will not be repeated and the discussion commences at step 78, wherein the duration of the ring signal is compared to the interval setting 70. If the duration of the ring signal is greater than the interval setting 70, the microprocessor 34 outputs a signal to cause the ring detector 10 to enter an "off-hook" condition in a step 86. If a dial tone is detected in a step 88, the "off-hook" condition is terminated to "release" the line in a step 90, and the ring detector 10 loops back to step 74 awaiting a ring signal. If at step 88 a dial tone is not detected, a ring detection signal is produced at step 80.

Figure 8:
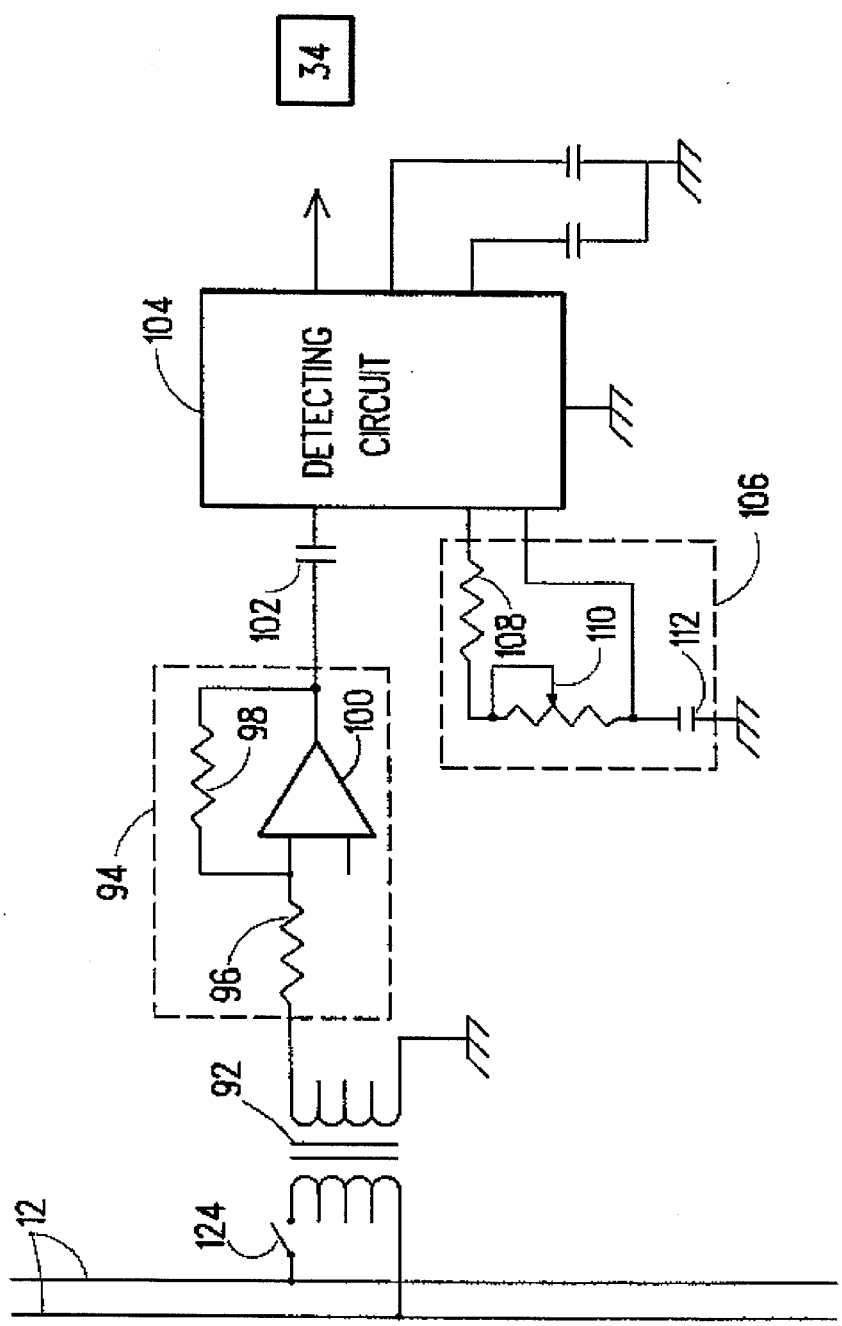
FIG. 8 is a schematic diagram of an exemplary signal conditioning circuit.

FIG. 8 illustrates an exemplary embodiment of a dial tone detector when the circuit is connected to the telephone line 12 via a relay 124. An isolation transformer 92 couples the phone line 12 (depicted as a two-wire phone line) to isolate the DC voltage on the phone line while simultaneously allowing an AC dial tone signal to pass to a signal buffer 94. The signal buffer 94 includes a first resistor 96, a second resistor 98, and an opamp 100. The output from the opamp 100 is coupled through a capacitor 102 to a detecting circuit 104, such as an LM567, for detecting certain tone signals. The particular tone signals to be detected are set by a tuning circuit 106, including a resistor 108, a variable resistor 110 and a capacitor 112. The tuning circuit 106 is set to detect 350 Hz tones indicative of a dial tone. When a dial tone is detected, the detecting circuit 104 outputs a dial tone detection signal to the microprocessor 34 as shown in FIG. 2.

Another signal conditioning circuit 30 is a phone line DC voltage sensor that enhances performance of the ring detector 10 by inhibiting ring detection when an "off-hook" condition exists. An "off-hook" state occurs when a telephone line is in use and is indicated by the DC voltage on the telephone line being lower than its nominal "on-hook" value.

Figure 9:
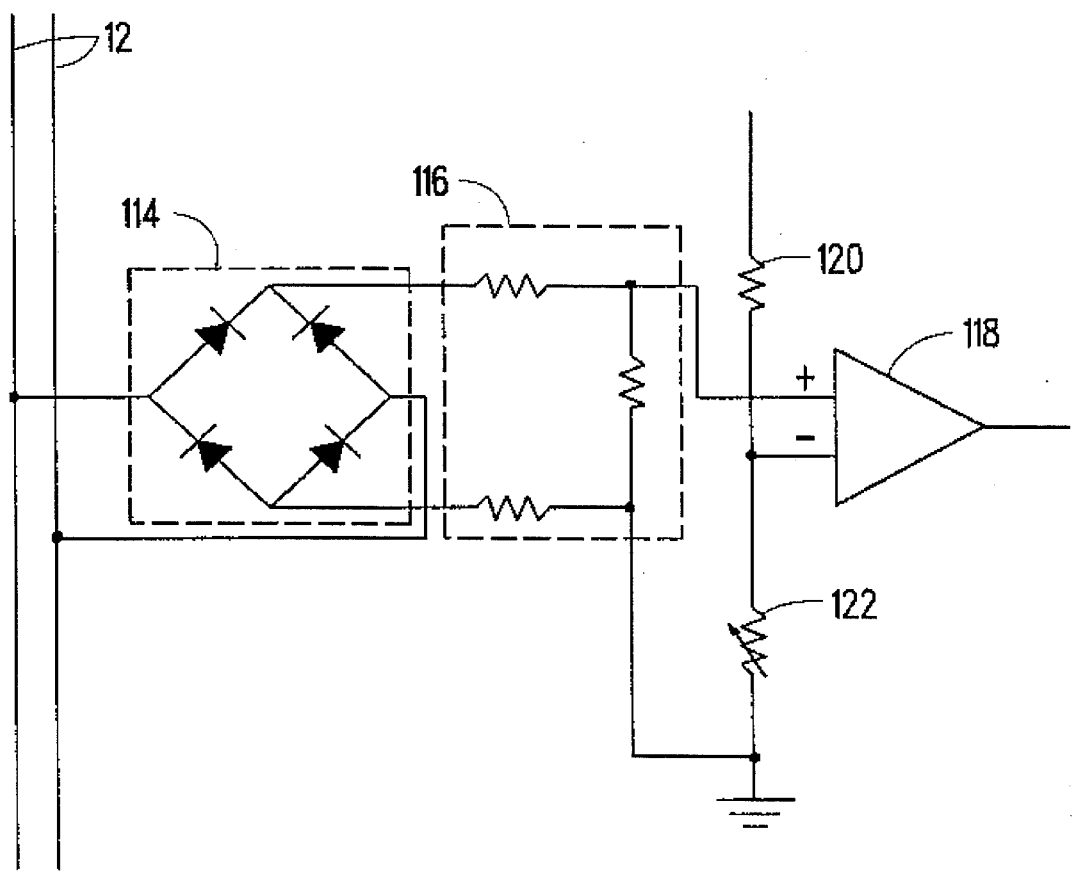
FIG. 9 is a schematic diagram of another exemplary signal conditioning circuit.

FIG. 9 is a schematic diagram of an exemplary DC voltage sensor which includes a full-wave rectified bridge 114 coupled to the telephone line 12 (depicted as a two-wire phone line). The DC voltage is then applied to a voltage divider 116. A comparator 118 compares the DC voltage from the voltage divider 116 to a reference voltage established by a first and second resistor, 120 and 122 respectively. The comparator 118 outputs a low voltage signal when the voltage from the voltage divider 116 is below the reference voltage, indicating that the telephone line 12 is in an "off-hook" state. The reference voltage is set to a voltage corresponding to about a ten volt DC line voltage.

Although the invention has been shown and described with respect to exemplary embodiments thereof, various other changes, omissions and additions in form and detail thereof, may be made therein without departing from the spirit and scope of the invention.

What is claimed is:

1. A telephone ring detector for detecting a ring signal voltage, said ring detector comprising:

a voltage threshold setting device for establishing a voltage threshold and providing an output signal when said ring signal voltage exceeds said voltage threshold; and a microprocessor responsive to said voltage threshold setting device, said microprocessor capable of measuring a time duration of said output signal and comparing said time duration with a predetermined time interval value, said microprocessor outputting a ring detection signal when said time duration exceeds said predetermined time interval value, said predetermined time interval being less than a ring cycle of said ring signal voltage.

2. The ring detector of claim 1, wherein said voltage threshold setting device comprises a first zener diode in series with a second zener diode, each said zener diode having a predetermined voltage value corresponding to said voltage threshold.

3. The ring detector of claim 2, further comprising an opto-isolator responsive to said voltage threshold setting device, said opto-isolator providing a binary signal to said microprocessor when said ring signal voltage exceeds said voltage threshold.

4. The ring detector of claim 2, wherein said first and second zener diodes have a voltage value of 39 volts.

5. The ring detector of claim 4, wherein said voltage threshold is approximately 45 volts.

6. The ring detector of claim 1, wherein said predetermined time interval is less than ¼ of a ring cycle of said ring signal voltage.

7. The ring detector of claim 1, wherein said predetermined time interval value of said microprocessor is less than 50 milliseconds.

8. The ring detector of claim 1, wherein said predetermined time interval value of said microprocessor is approximately five milliseconds.

9. The ring detector of claim 1, further comprising a line switch having at least two output lines, said line switch receiving said ring detection signal from said microprocessor and directing communication signals to one of said at least two output lines.

10. The ring detector of claim 9, further including a ring signal generator responsive to said microprocessor and providing a ring signal to said line switch.

11. The ring detector or claim 10, wherein said ring signal generator is interposed between said microprocessor and said line switch.

12. The ring detector of claim 10, further including a line monitor that controls passage of communication signals to said line switch.

13. The ring detector of claim 10, wherein said ring signal generator is interposed between said microprocessor and said line switch and further including a line monitor interposed between said ring signal generator and said line switch, said line monitor controlling passage of communication signals to said line switch.

14. The ring detector of claim 1, further including an audible signal generator responsive to said microprocessor, said audible signal generator creating an audible signal upon receipt of said ring detection signal from said microprocessor.

15. The ring detector of claim 1, further comprising a comparator in communication with said voltage threshold setting device, said comparator comparing said ring signal voltage to said voltage threshold, said comparator providing said output signal when said ring signal voltage exceeds said voltage threshold.

16. The ring detector of claim 1, further comprising a holding circuit responsive to said microprocessor to maintain an "off-hook" condition.

17. The ring detector of claim 16, wherein said holding circuit comprises a relay in series with a holding coil for drawing a direct current.

18. The ring detector of claim 1, further including a ring signal coupler having a blocking capacitor accepting said ring signal voltage and having a current limiting resistor in series with said blocking capacitor, said current limiting resistor outputting said ring signal voltage to said voltage threshold setting device.

19. The ring detector of claim 1, further comprising a dial tone detector detecting a dial tone signal and outputting a dial tone detection signal to said microprocessor.

20. The ring detector of claim 1, further comprising a direct current voltage detector that provides a direct current voltage detection signal to said microprocessor.

21. The ring detector of claim 1, further comprising a timer operative to activate and deactivate said ring detector at predetermined times.

22. A telephone ring detector for detecting a ring signal voltage, said ring detector comprising:

a ring signal coupler having a blocking capacitor outputting said ring signal voltage to a current limiting resistor in series with said blocking capacitor;

a voltage threshold setting device in series with said current limiting resistor, said voltage threshold setting device comprising a first zener diode in series with a second zener diode, each said zener diode having a voltage value of 39 volts;

an opto-isolator in communication with said voltage threshold setting device, said opto-isolator providing an output signal when said ring signal voltage is above said voltage threshold;

a microprocessor responsive to said opto-isolator, said microprocessor including a timer for measuring a time duration of said output signal of said opto-isolator, said microprocessor comparing said time duration with a preselected time interval value being less than 50 milliseconds, said microprocessor outputting a ring detection signal when said time duration exceeds said preselected time interval value; and a line switch having at least two output lines, said line switch receiving said ring detection signal from said microprocessor and directing communication signals to one of said at least two output lines.

23. A method of detecting a telephone ring signal comprising:

detecting a ring signal voltage;

comparing said ring signal voltage to a predetermined threshold voltage;

providing an output when said ring signal voltage exceeds said predetermined threshold voltage;

measuring a time duration of said output;

comparing said time duration to a predetermined time interval; and providing a ring detection output signal when said time duration of said output exceeds said predetermined time interval, said predetermined time interval being less than a ring cycle.

24. The method of claim 23, wherein said predetermined threshold voltage is less than a peak ring signal voltage.

* * * * *